(12) United States Patent
Kilper et al.

(10) Patent No.: US 6,848,567 B2
(45) Date of Patent: Feb. 1, 2005

(54) ACCUMULATION CONVEYOR

(75) Inventors: John J. Kilper, St. Charles, MO (US); Michael J. Leary, O'Fallon, MO (US)

(73) Assignee: Alvey Systems, Inc., St. Louis, MO (US)

( * ) Notice: Subject to any disclaimer, the term of this patent is extended or adjusted under 35 U.S.C. 154(b) by 0 days.

(21) Appl. No.: 09/993,812

(22) Filed: Nov. 16, 2001

(65) Prior Publication Data

US 2003/0094350 A1 May 22, 2003

(51) Int. Cl.[7] .............................................. B65G 43/00
(52) U.S. Cl. .................................................. 198/460.1
(58) Field of Search ....................... 198/781.06, 781.05, 198/781.07–781.11, 460.1

(56) References Cited

U.S. PATENT DOCUMENTS

| | | | | |
|---|---|---|---|---|
| 3,156,345 A | * | 11/1964 | Good ..................... | 198/781.09 |
| 3,762,533 A | * | 10/1973 | Giles ..................... | 198/634 |
| 3,768,630 A | | 10/1973 | Inwood et al. | |
| 4,109,783 A | * | 8/1978 | Vogt ..................... | 198/781.06 |
| 4,919,255 A | * | 4/1990 | Morgan et al. ........ | 198/781.06 |
| 4,927,005 A | * | 5/1990 | Sirefelt ................. | 198/781.08 |
| 5,191,967 A | * | 3/1993 | Woltjer et al. ......... | 198/781.06 |
| 5,316,130 A | | 5/1994 | Heit et al. | |
| 5,358,097 A | | 10/1994 | Bakkila et al. | |
| 5,429,225 A | | 7/1995 | Schiesser et al. | |
| 5,540,323 A | | 7/1996 | Schiesser et al. | |
| 5,810,154 A | * | 9/1998 | Brouwer et al. ....... | 198/718 |
| 5,906,267 A | | 5/1999 | Heit et al. | |
| 6,098,789 A | * | 8/2000 | Ernst ..................... | 198/809 |

\* cited by examiner

*Primary Examiner*—Richard Ridley
(74) *Attorney, Agent, or Firm*—Polster, Lieder, Woodruff & Lucchesi, L.C.

(57) ABSTRACT

There is provided an apparatus that is composed of a first plurality of zones. The zones are capable of being separately driven in order to accumulate or transport cartons. A sensor is disposed within each zone for sensing the presence of a carton within the zone, and an actuator allows movement of the sensor between an up position wherein the sensor is capable of contacting the cartons and a down position wherein the sensor is not capable of contacting the cartons. The actuators are adapted such that when the conveyor switches from an accumulation mode to a transportation mode each actuator provides a signal to an adjacent, upstream zone to begin conveying cartons only when the zone senses the absence of a carton within the zone. A novel method for using the apparatus is also provided.

13 Claims, 11 Drawing Sheets

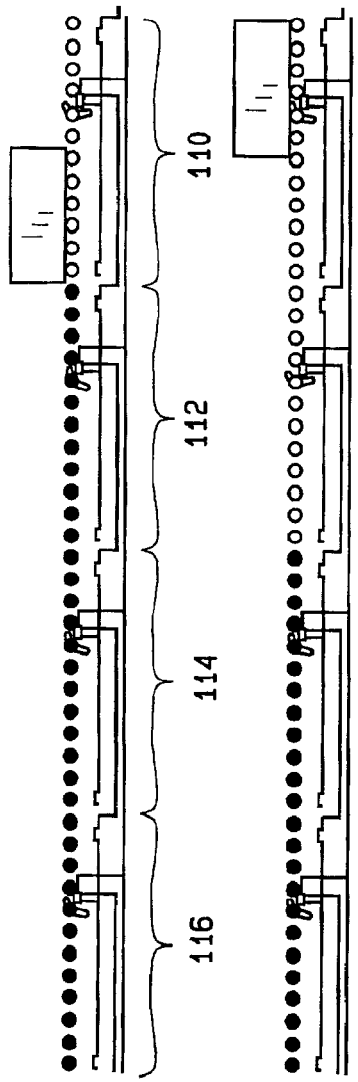
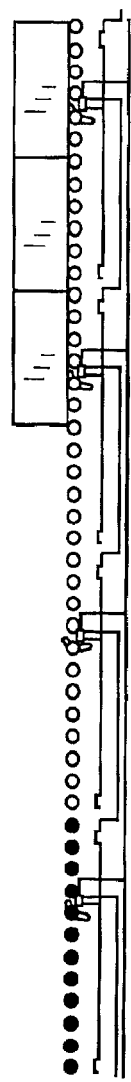
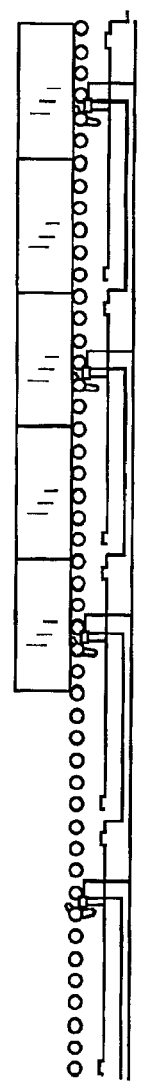
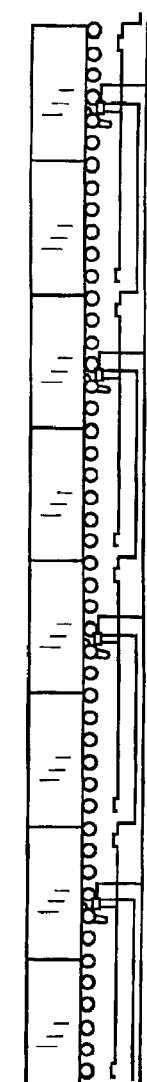
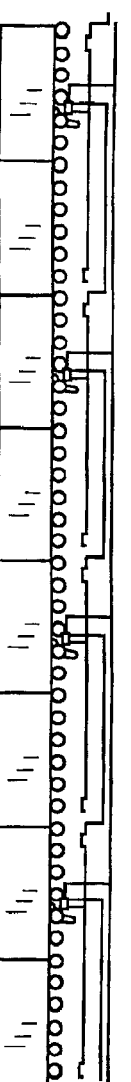
FIG. 7A
FIG. 7B
FIG. 7C
FIG. 7D
FIG. 7E

ACCUMULATION CONVEYOR

TECHNICAL FIELD

The present invention relates generally to a conveyor system. More specifically, it relates to an improved accumulating conveyor that effectively controls the rate of discharge transportation of accumulated cartons.

BACKGROUND OF THE INVENTION

Zero pressure live roller conveyors began appearing in the marketplace in the early 1970's as flat belt-driven live roller conveyors comprised of multiple drive zones that would either engage to transport cartons or disengage to stop transporting cartons. The state of engagement within a zone normally was dependent on whether there was a carton present within a downstream zone. A sensor roller protruded slightly above the top plane of the conveyor roller bed and would be depressed by the weight of a carton. When the sensor roller was depressed, the drive in the adjacent upstream zone would disengage and enter a neutral state. Once cartons were conveyed off the sensor roller, the sensor roller would return to its original position above the plane of the conveyor roller bed and the conveyor in the adjacent zone upstream would reengage to transport cartons.

It soon became apparent that the sensor roller and associated air valve were cycling with the passage of each carton. The valves were exhausting air and then refilling with each cycle. While this cycling was necessary when cartons were accumulating, it wasted vast amounts of compressed air when cartons were simply transporting. Many ideas began to surface in order to conserve the compressed air. Some ideas consisted of incorporating a small orifice in the pneumatic conduit to slow down the exhausting of air from the associated actuators whenever the sensor roller was depressed. This scheme also slowed down the filling of actuators, but it did manage to sharply reduce the volume of compressed air used during transportation.

U.S. Pat. No. 3,768,630 to Inwood et al. is an example of another scheme. Inwood monitors the discharge of the conveyor to see if the cartons are to be transported or accumulated. If product is to be transported, the sensor valves are serially bypassed so that any air lost during the cycling is merely from the small amount of volume within the hoses connecting the valve to the actuators. However, if one of the sensor valves would not exhaust properly, conveyor drive from that point upstream would continue whether the sensor roller was depressed or not. This would create crushing pressure on the cartons and performance failure.

Since the time of Inwood, conveyor speeds and the number of cartons being conveyed has increased significantly. The associated noise, fatigue and impact forces on the sensor roller and valve began to take its toll with high failure rates and maintenance attention required. U.S. Pat. No. 5,316,130 to Heit et al. used retractable sensor rollers that solved both the air volume and roller/valve cycling problems by retracting the sensor rollers below the conveying surface whenever the conveyor was transporting. When the conveyor was accumulating, the sensor rollers were allowed to pop up. U.S. Pat. No. 5,358,097 to Bakkila et a. and U.S. Pat. No. 5,429,225 to Schiesser et al. were variations on this concept.

However, the prior art still has shortcomings that reduce the lifespan and performance of accumulating conveyors. One shortcoming of the prior art was the need to attach hoses to moving parts. With the light forces involved with the sensor roller and valve, any variation in hose length or position could keep the valve or the crank arm from moving to its intended position. Thus, if the amount of hose available for flexing is not just right or if the orientation of hose fittings is not just right, the assembly becomes useless. This is particularly troublesome when maintenance personnel make repairs in the field.

The present invention provides an advantage in performance over the prior art. The referenced patents all describe a scheme that has the sensor roller retract as soon as the actuators within the zone are pressurized. That is, when the first zone is pressurized, the first sensor roller is retracted and the first sensor valve begins to pressurize the second zone actuators very quickly. This sequence repeats all the way along the length of the conveyor with any cartons on board transporting with very little space between individual cartons and with no regard for whether cartons are present in the zone or not. If the production rate of the downstream conveyor is slower than the speed of the accumulation conveyor, there will be a build up of pressure as the accumulation conveyor tries to push more cartons than can be transported away. The referenced patents anticipate this condition and try to delay the retracting by using small orifice restrictions in the air lines. Depending on speed, desired discharge rate and product weight, the size of orifice must be varied to suit each individual product line.

SUMMARY OF THE INVENTION

In a first aspect of the present invention there is provided an accumulating conveyor comprising a first plurality of zones. The zones are capable of being separately driven in order to accumulate or transport cartons. A sensor is disposed within each zone for sensing the presence of a carton within the zone, and an actuator allows movement of the sensor between an up position wherein the sensor is capable of sensing the presence of cartons and a down position wherein the sensor is not capable of sensing the presence of cartons. The actuators are adapted such that when the conveyor switches from an accumulation mode to a transportation mode each actuator provides a signal to an adjacent, upstream zone to begin conveying cartons only when the zone senses the absence of a carton within the zone.

In another aspect of the present invention there is provided a method for controlling a conveyor comprising the steps of dividing the conveyor into a plurality of zones wherein each zone is capable of being separately driven in order to accumulate or transport cartons; providing a sensor for each zone, each sensor being capable of sensing the presence of cartons within the zone; holding the sensor in a down position where the sensor is not capable of contacting a carton when the conveyor is not accumulating cartons and while accumulating cartons when an adjacent, downstream sensor does not sense the presence of a carton within the downstream, adjacent zone; and holding the sensor in an up position where the sensor is capable of contacting a carton only when the conveyor is accumulating cartons and an adjacent, downstream sensor senses the presence of a carton within the downstream, adjacent zone.

BRIEF DESCRIPTION OF THE DRAWINGS

FIGS. 7A–E are diagrams showing the method of operation of accumulation of cartons of an accumulating conveyor according to an embodiment of the present invention;

DETAILED DESCRIPTION OF THE PREFERRED EMBODIMENT

Figure 1:
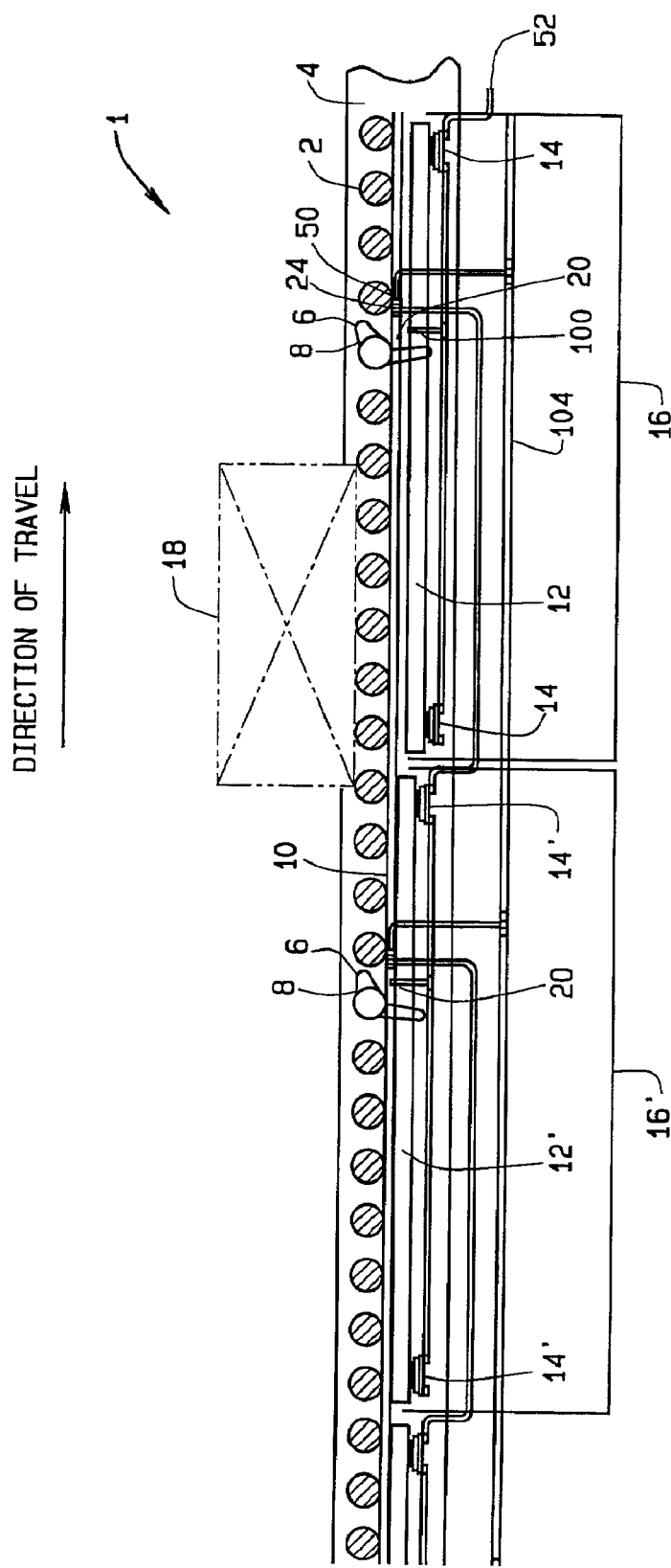
FIG. 1 is a sectional view of an accumulating conveyor according to an embodiment of the present invention.

While the invention is susceptible of embodiment in many different forms, there is shown in the drawings and will herein be described in detail embodiments of the invention. It is to be understood that the present disclosure is to be considered only as an example of the principles of the invention. This disclosure is not intended to limit the broad aspect of the invention to the illustrated embodiments. The scope of protection should only be limited by the accompanying claims.

The present invention is an improved accumulating conveyor system. The system comprises a plurality of rollers over which cartons are conveyed or accumulated. The rollers are divided into a number of zones, and the rollers of each zone are driven separately from other zones. In this manner, rollers within zones where cartons are accumulating can be stopped while rollers within zones in which cartons are conveying continue to move cartons through the zone. Sensor rollers determine the presence of a carton in the zone. A sensor roller protrudes above the rollers while accumulating only when a downstream zone senses the presence of a carton, otherwise the sensor roller is held below the rollers. At some point, the conveyor switches from an accumulation mode to a transportation mode. When a carton no longer holds down the sensor roller, the sensor roller protrudes above the rollers only for a brief instance after the carton is gone and is then retracted below the rollers.

I. Structure of the Conveyor and Smart Actuator

Referring to FIG. 1, there is provided an accumulating conveyor 1 comprising a plurality of rollers 2 attached to a frame 4. Also provided are sensor rollers 6 attached to levers 8. A belt 10, which is driven by a motor (not shown), rotates the rollers 2 by running against the bottom of the rollers 2. Tracks 12 are supported by pairs of bladders 14, and each track 12 and pair of supporting bladders 14 divide the conveyor 1 into zones 16, 16'. Zones 16 can be referred to as "upstream zones," which are zones against the direction of travel from a reference zone, and "downstream zones," which are zones that are with the direction of travel from a reference zone. When the bladders 14 expand, the track 12 is raised, as in zone 16'. The track 12 forces the belt 10 against the rollers 2 to cause the rollers 2 to rotate. When the bladders 14 collapse, the track 12 is lowered, as in zone 16, and the drive belt 10 does not drive the rollers 2 within that zone. As a result, cartons 18 are conveyed through zones 16' when the bladders 14 are expanded and not conveyed through zones 16 when the bladders 14 are collapsed.

Also according to the present invention, the sensor rollers 6 protrude higher than the rollers 2 when sensing the presence of cartons 18, as in the case of zone 16, and are pulled down below the rollers 2 when not sensing the presence of cartons 18, as in zone 16'. An actuator 20 is energized to lower the sensor roller 6, and a spring 22 (FIG. 3) raises the sensor roller 6 when the actuator 20 is de-energized.

Figure 2:
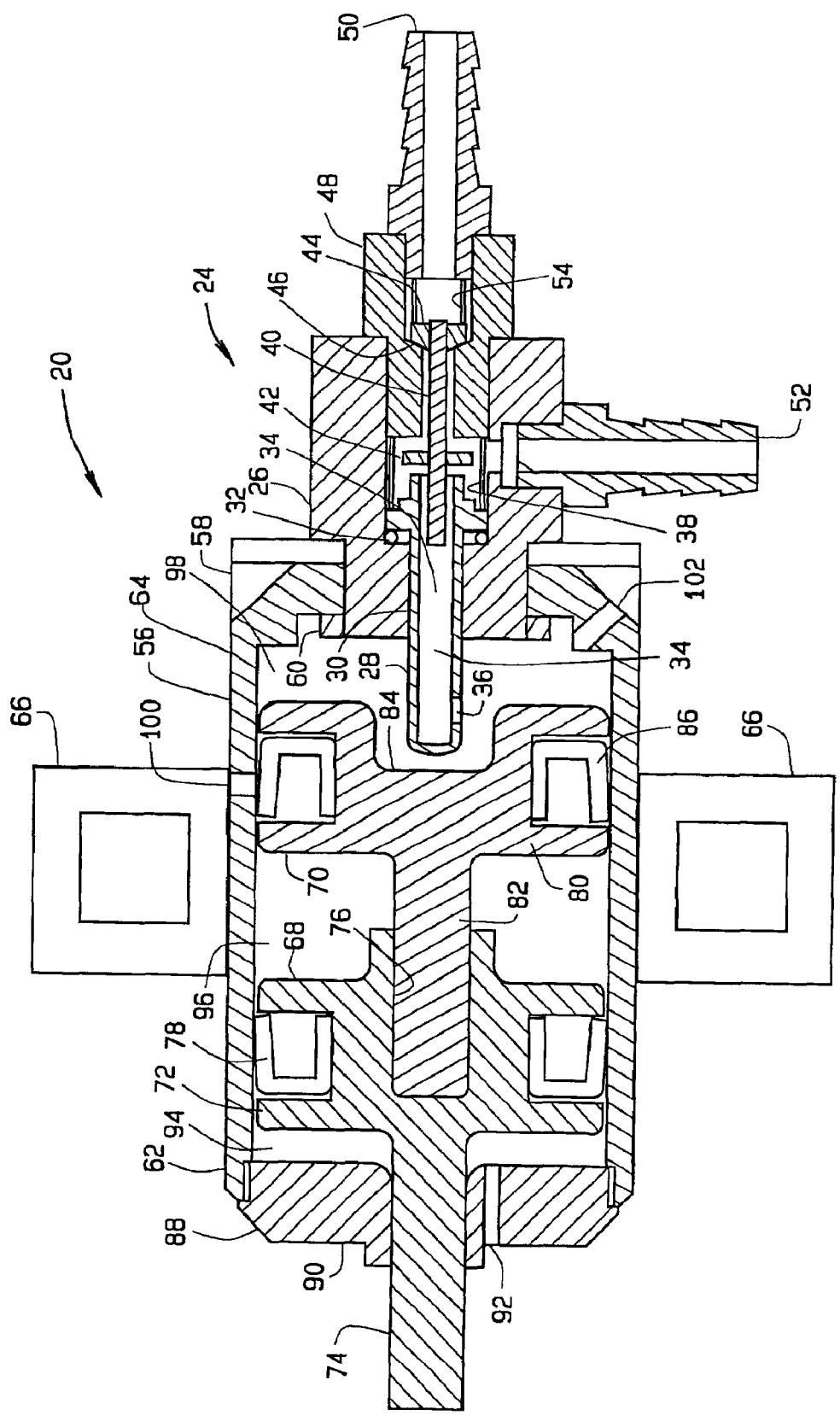
FIG. 2 is a sectional view of an actuator according to an embodiment of the present invention.

Referring to FIG. 2, the actuator 20 comprises a three-way valve 24 having a body 26 having a movable stem 28 disposed within a bore 30 therein and sealed with an O-ring 32. The stem 28 has a passage 34 and an orifice 36 at an end. The stem 28 is movable within the bore 30 and biased to the position shown in FIG. 2 by a spring 38. When the valve stem 28 is pushed into the bore 30, it contacts a disc 42 which is attached to a valve plunger 40 that has a head 44 attached thereto that blocks compressed air from entering the passage 34 of the valve stem 28. When the valve head 44 is forced away from a valve seat 46 of a valve seat body 48, compressed air is allowed to flow from an input 50 to an output 52. The valve head 44 is biased against the valve seat 46 by a spring 54. When the valve head 44 contacts the valve seat 46 compressed air does not flow from the input 50 to the output 52 and the passage 34 of the valve stem 28 is not blocked by the disc 42. As result, air is allowed to flow from the output 52, through the passage 34, to the orifice 36. A suitable three-way valve 24 is available from the Clippard Instrument Laboratory, Inc. of Cincinnati, Ohio as Model No. MAV-3.

The valve 24 is attached to a cylinder housing 56 and mounting bracket 58 with a nut 60. The cylinder housing 56 is preferably made from an aluminum alloy and has a top 62 and a bottom 64. The mounting bracket 58 comprises two ears 66 for mounting the actuator 20 to the conveyor 1. Disposed within the cylinder housing 56 are a first piston 68 and a second piston 70. The first piston 68 comprises a first piston head 72 and a first piston stem 74 or rod connected to one end. The head 72 has a first piston guide bore 76 in the end opposed to the stem 74 and a peripheral seal 78. The second piston 70 comprises a second piston head 80 and a second piston stem or rod 82 connected to one end. The head 80 has a second piston recess 84 in the end opposed to the stem 82 and a peripheral seal 86. A cylinder cap 88 having a centrally located stem bore 90 and a pressure relief bore 92 encloses the interior of the cylinder housing 56. When assembled, the first piston stem 74 protrudes through the cap stem bore 90 and receives the second piston stem 82 within the first piston bore 76. The pistons 68, 70 define a first chamber 94, a central chamber 96 and a third chamber 98. The size of the chambers 94, 96, 98 change as the pistons 68, 70 move forwardly or rearwardly to the top or bottom of their range of motion within the cylinder housing 56. The cylinder housing 56 also comprises an air inlet 100 and a pressure relief bore 102. The air inlet 100 is connected to the bladders 14.

Referring back to FIG. 1, the bladders 14 within a zone 16 are attached to the output 52 of the valve 24 of an adjacent downstream zone (not shown) and to the air inlet 100 of the cylinder housing 56 within the same zone 16. The input 50 of the valve 24 is connected to a compressed air supply line 104.

II. Operating Modes of Smart Actuator

Figure 3:
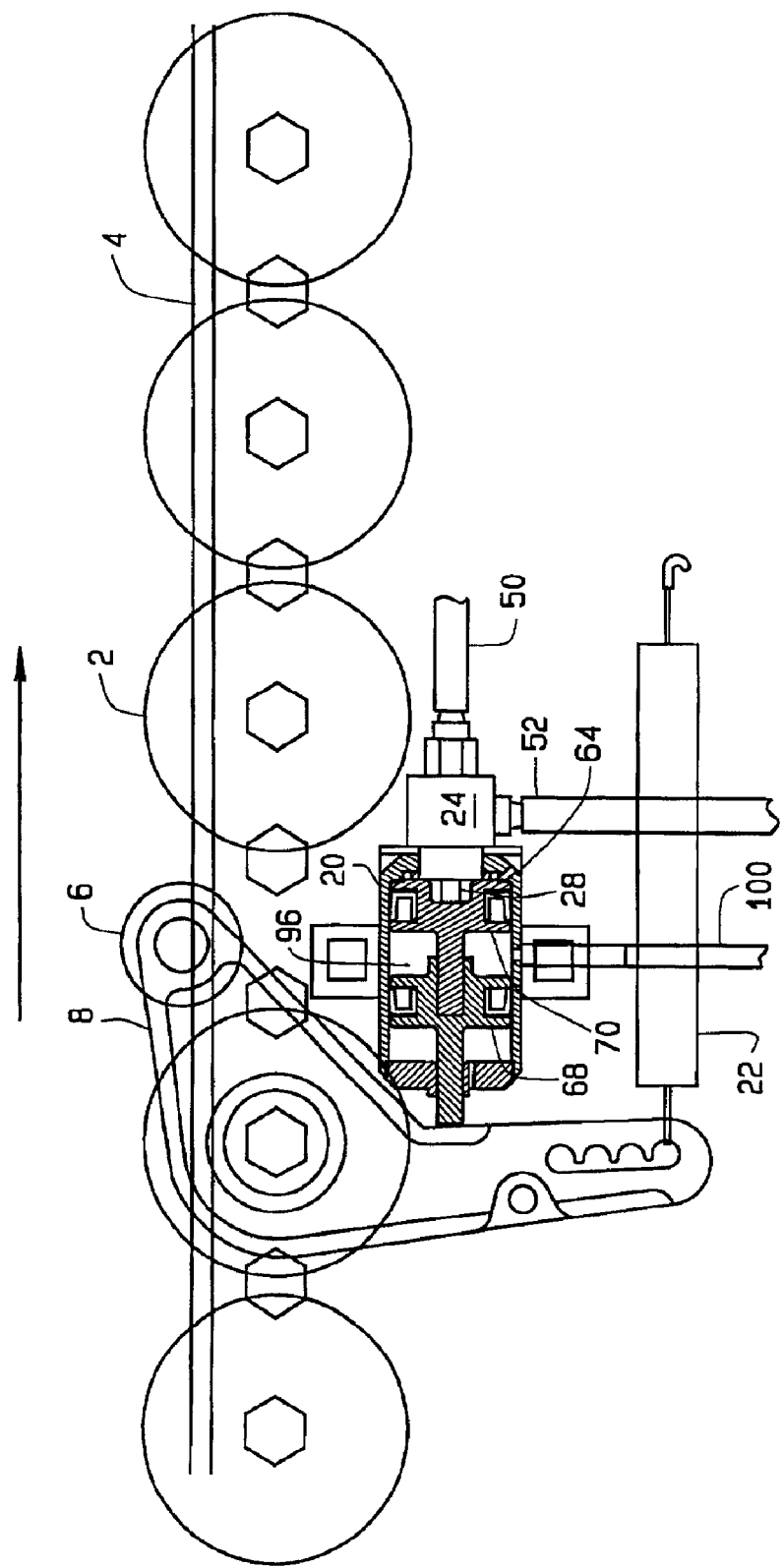
FIG. 3 is a sectional view of an actuator and sensor roller in a first operating mode according to an embodiment of the present invention.
Figure 4:
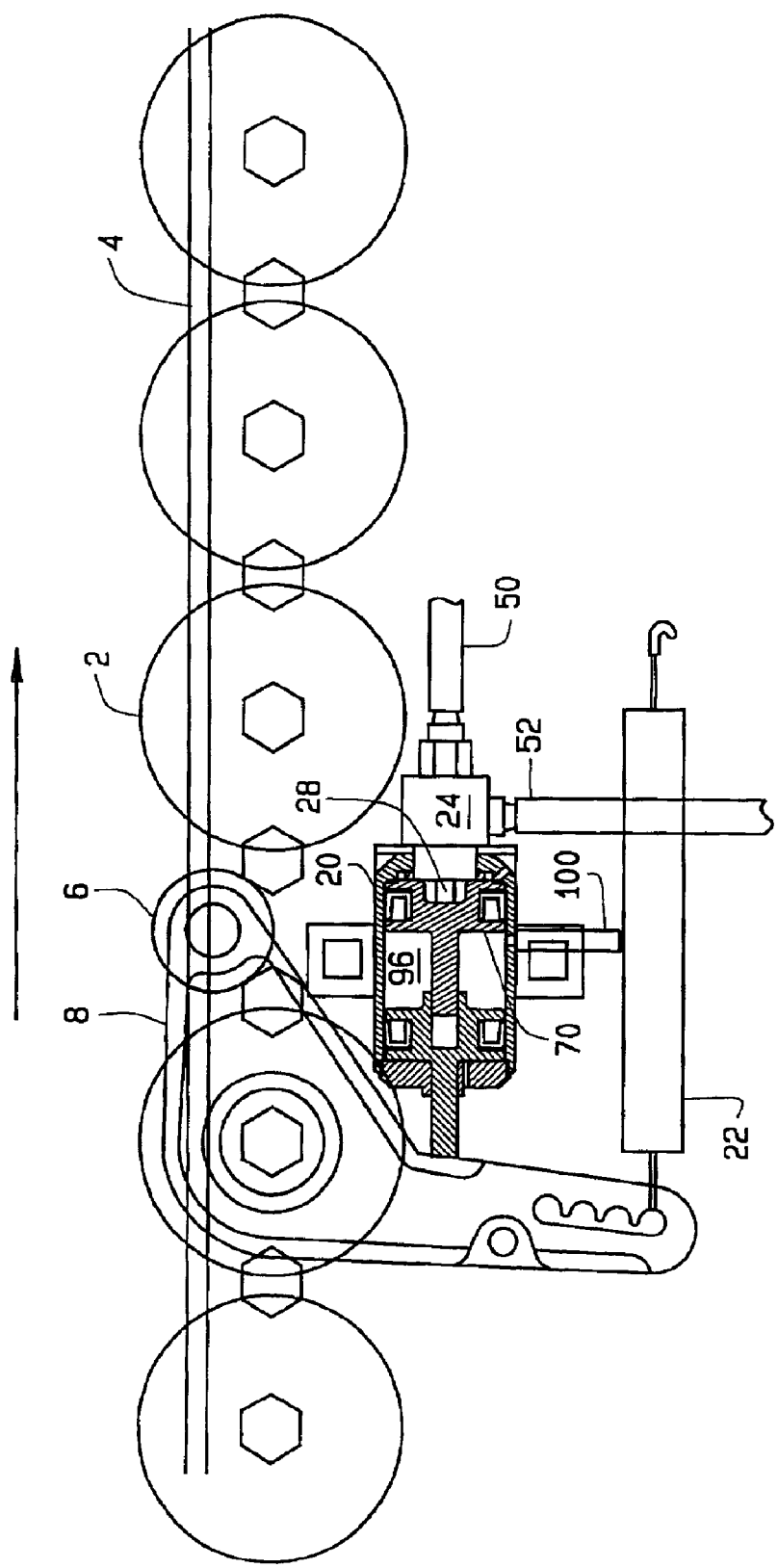
FIG. 4 is a sectional view of an actuator and sensor roller in a second operating mode according to an embodiment of the present invention.
Figure 5:
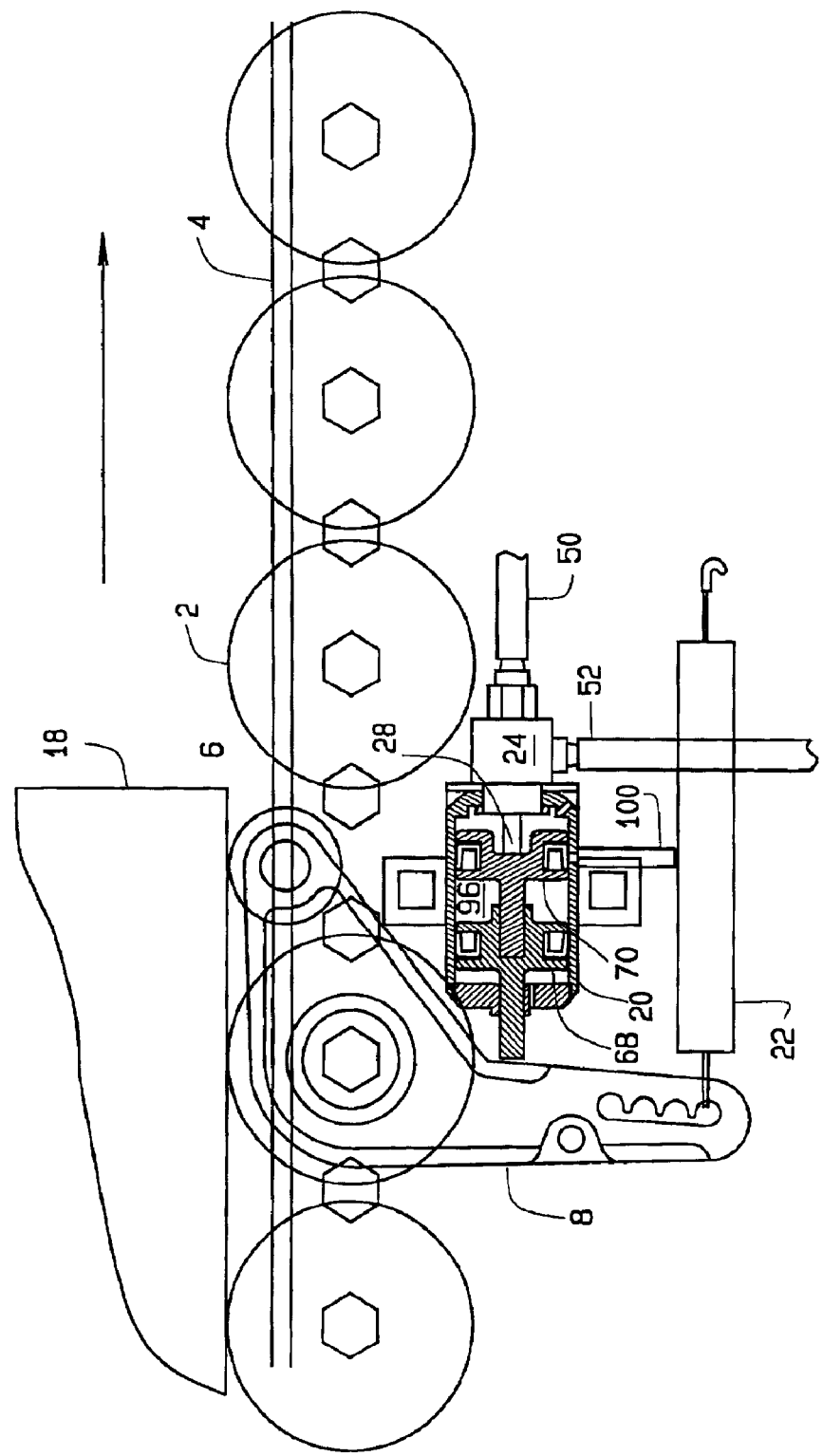
FIG. 5 is a sectional view of an actuator and sensor roller in a third operating mode according to an embodiment of the present invention.
Figure 6:
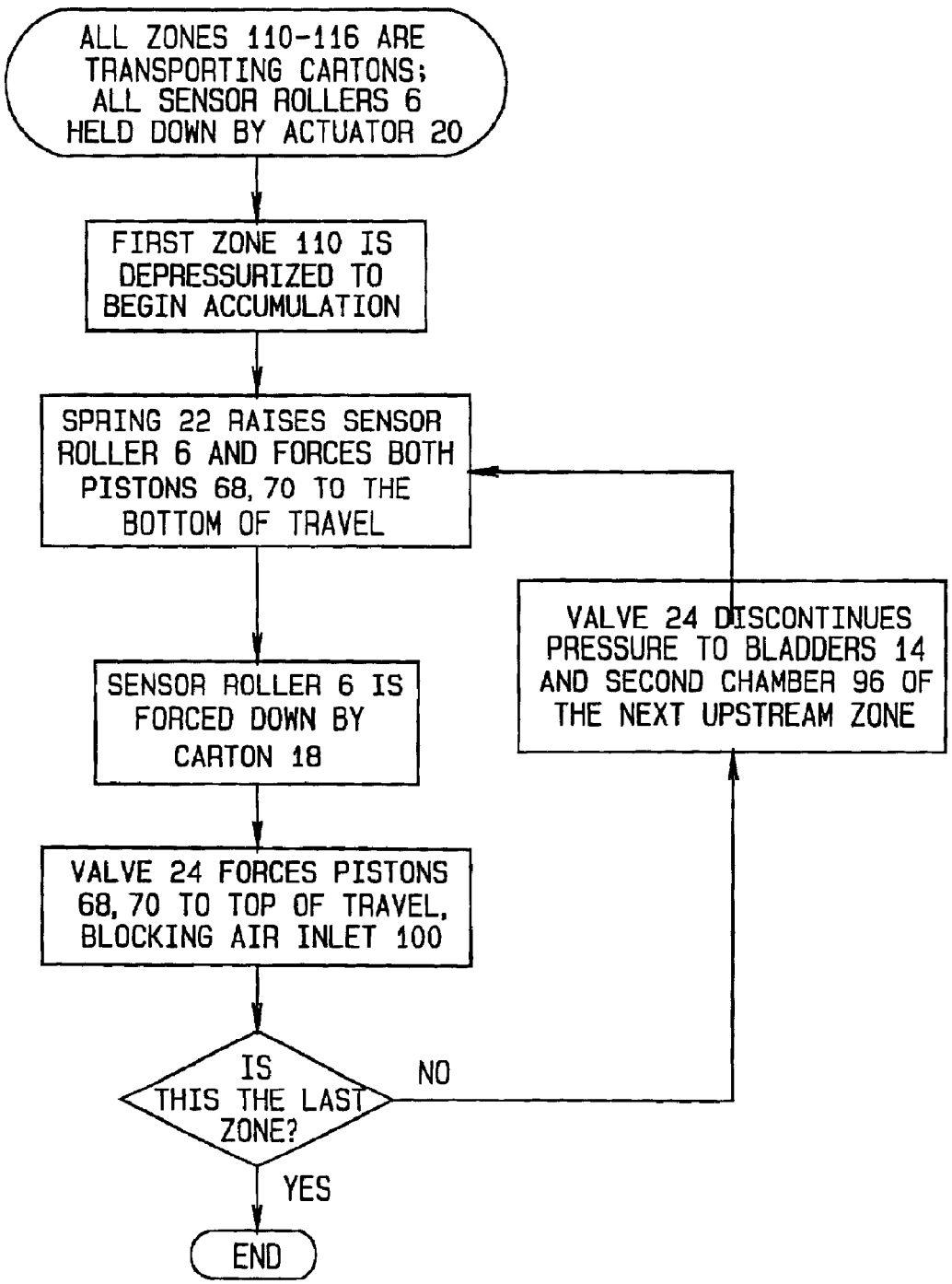
FIG. 6 is a flow chart showing the method of operation of accumulation of cartons of an accumulating conveyor according to an embodiment of the present invention.
Figure 8:
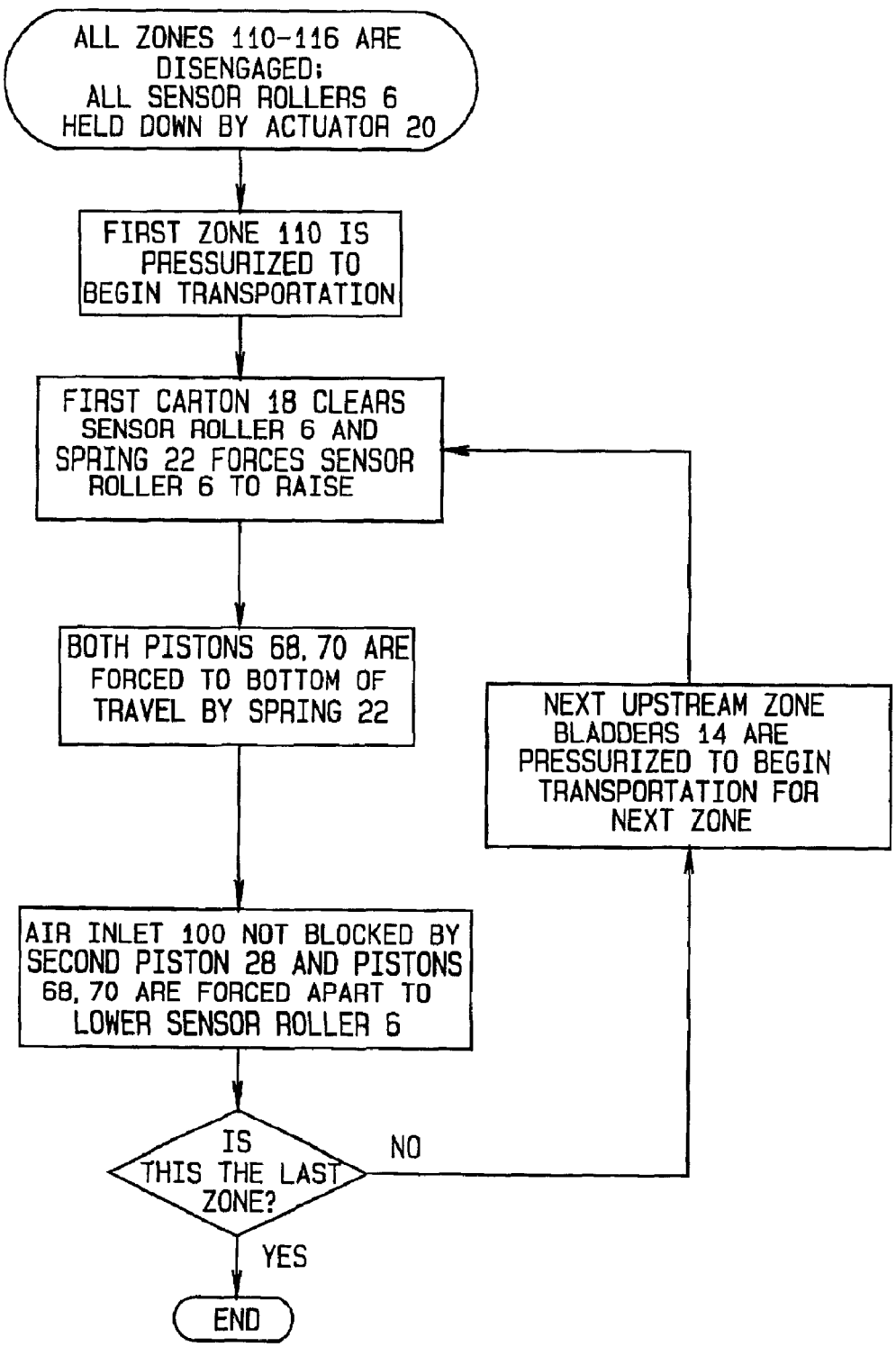
FIG. 8 is a flow chart showing the method of operation of transportation of accumulated cartons of an accumulating conveyor according to an embodiment of the present invention.
Figure 9:
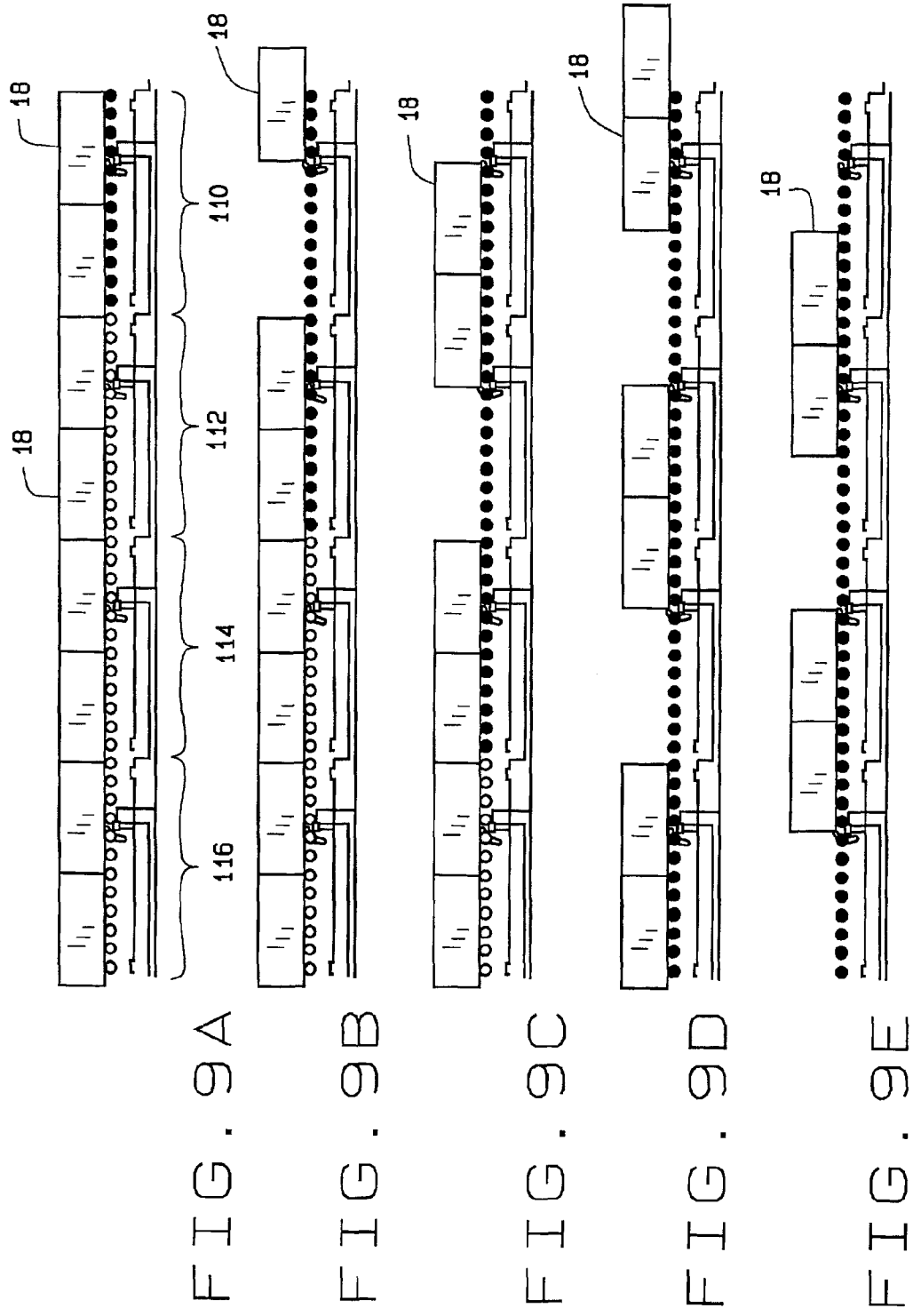
FIGS. 9A–E are diagrams showing the method of operation of transportation of accumulated cartons of an accumulating conveyor according to an embodiment of the present invention.

Referring to FIGS. 3, 4 and 5, the sensor rollers 6 have three modes: a first mode where the sensor roller 6 is up and ready to sense the presence of cartons 18 (FIGS. 1 & 5), a second mode where the sensor roller 6 is held down by the actuator 20 (FIG. 4) and a third mode where the sensor roller 6 is held down by a carton 18 (FIG. 5). Referring to FIG. 3, in the first mode the sensor roller 6 is pulled up by the spring 22 and both pistons 68, 70 are forced rearwardly to the bottom 64 of the cylinder housing 56. The second piston 70 forces the valve stem 28 of the valve 24 into the valve 24, which allows air to flow directly from input 50 to output 52. Additionally, in this mode the first and second pistons 68, 70 are positioned such that the air inlet 100 (which connects to the bladders 14) is in communication with the central chamber 96.

Referring to FIG. 4, when in the second mode, compressed air is supplied to the central chamber 96 through the air inlet 100. This overcomes the force of the spring 22 and, as a result, the second piston 70 remains forced to the bottom 64 of the cylinder housing 56 and the first piston 68 is forced to the top 62 of the cylinder housing 56. As a result, the first piston 68 forces the lever 8 to rotate about its axis and retract the sensor roller 6.

Referring to FIG. 5, in the third mode the sensor roller 6 is pushed down by a carton 18 and the valve stem 28 forces the pistons 68, 70 to the top 62 of the cylinder housing 56 interrupting communication through the air inlet 100. Because valve stem 28 is extended from the valve 24, air flow between the input 50 and the output 52 is cut off and the output 52 is exhausted into the third chamber 98 through the orifice 36 in the valve stem 28 and thence to atmosphere through the pressure relief bore 102.

III. Operation of the Conveyor With Smart Actuators

The actuators 20 of the present invention, when attached as shown in FIG. 1, all cooperate to provide for coordinated operation of the zones 16 to accumulate and transport cartons 18. Referring to FIGS. 6 & 7A–E, initially a first zone 110, a second zone 112, a third zone 114 and a fourth zone 116 are all being driven by the drive belt 10. While the zones 110–116 are transporting cartons 18, the sensor rollers 6 are retracted and the actuators 20 of those zones 110–116 are operating in the second mode as in FIG. 4.

Referring to FIG. 7A, in order to accumulate cartons 18 an air supply line to the bladders 14 of the first zone 110 is exhausted by a downstream controlling mechanism, such as a belt conveyor. As a result, the bladders 14 collapse, and the drive belt 10 no longer drives the rollers 2 of the first zone 110. In FIGS. 7A–7E, driven rollers are indicated as shaded rollers and undriven rollers are indicated as unshaded rollers. The bladders 14 are attached to the air inlet 100 of the actuator 20 causing the central chamber 96 of the actuator 20 of the first zone 110 to depressurize, and the actuator 20 enters the first mode shown in FIG. 3. In this mode, the sensor roller 6 is raised and ready to sense the presence of cartons 18 within the zone 110.

Second zone 112 is still driving and provides enough kinetic energy to the carton 18 as it enters the first zone 110 to coast over the non-driven rollers 2 in zone 110 and force the sensor roller 6 down, as in FIG. 7B. As the sensor roller 6 is pushed down, the actuator 20 of the first zone 110 enters into the third mode shown in FIG. 5. This causes the output 52 of the actuator 20 of the first zone 110 to exhaust. Since the output 52 of the actuator 20 of the first zone 110 is connected to the bladders 14' and central chamber 96 of the actuator 20 of the second zone 112, the bladders 14' of the second zone 112 begin to collapse. As a result, the drive belt 10 no longer drives the rollers 2 of the second zone 112 and the actuator 20 of the second zone enters into the first mode of FIG. 3. Eventually, the second zone 112 fills with cartons 18, and the cartons 18 force the sensor roller 6 down. When the sensor roller 6 is forced down, the actuator 20 enters the third mode as in FIG. 5. This causes the output 52 of the actuator 20 of the second zone 112 to depressurize the bladders 14" and central chamber 96 of the third zone 114. This cycle continues until all zones 102-116 have accumulated cartons 18, as in FIGS. 7C, 7D, and 7E. It should be understood that while four zones are illustrated in the above example of carton accumulation, any number of zones may be provided to accumulate cartons using the concept of the present invention.

After cartons 18 have accumulated, it may be desired to again convey the cartons 18 through the zones 110–116. Referring to FIGS. 8 and 9A–9E, in order to begin the procedure pressure is supplied to the bladders 14 and air inlet 100 of the actuator 20 of the first zone 110. The pressure is supplied by a downstream mechanism, such as a belt conveyor. As a result, the bladders 14 expand and the track 12 forces the drive belt 10 against the rollers 2 to convey the cartons 18 within the first zone 110, as in FIG. 9A. In FIGS. 9A–9E, driven rollers are indicated as shaded rollers and undriven rollers are indicated as unshaded rollers. At this point, because the sensor roller 6 is held down by the cartons 18, the air inlet 100 of the actuator 20 is blocked and the central chamber 96 does not pressurize. However, soon the carton 18 exits the first zone 110 and it no longer holds down the sensor roller 6. Therefore, the force of the spring 22 raises the sensor roller 6. As soon as the sensor roller 6 is raised, the actuator 20 enters the first mode of FIG. 3 thereby allowing the pressurized air from the bladders 14 to enter the central chamber 96, and the actuator 20 immediately enters the second mode of FIG. 4.

As the actuator 20 enters the second mode, the valve 24 allows air to pass to the output 52 in order to inflate the bladders 14' of the second zone 112. This cycle continues until all of the zones 110–116 are conveying cartons 18. It should therefore be appreciated that a zone will not begin conveying until the sensor roller 6 in a downstream zone has been allowed to raise by the absence of a carton 18.

IV. Structure of Dummy Actuators

Figure 10:
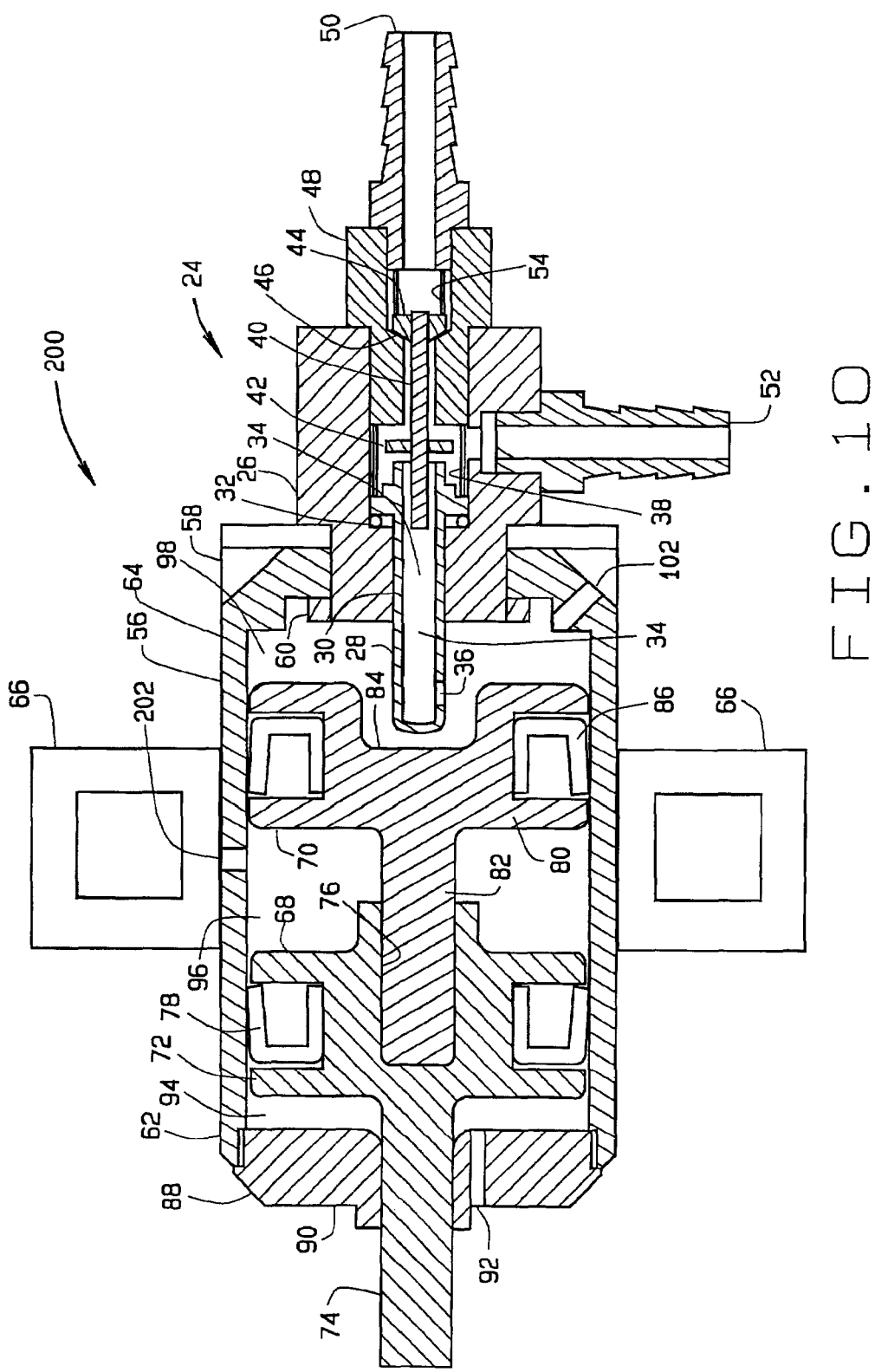
FIG. 10 is a sectional view of a dummy actuator according to another embodiment of the present invention.
Figure 11A:
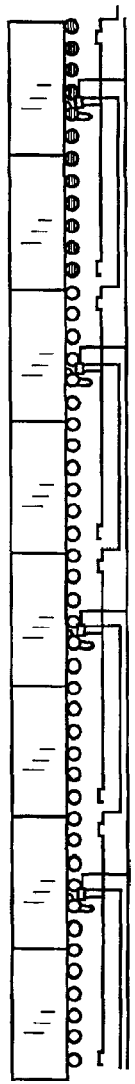
FIGS. 11A–E are diagrams showing the method of operation of transportation of accumulated cartons of an accumulating conveyor using smart and dummy actuators according to another embodiment of the present invention.
Figure 11B:
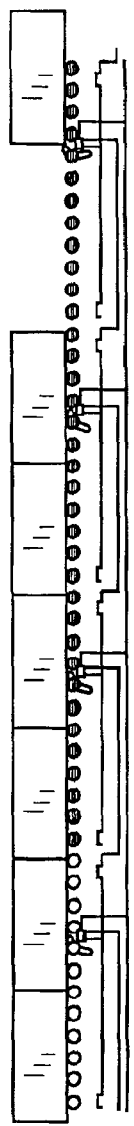
Figure 11C:
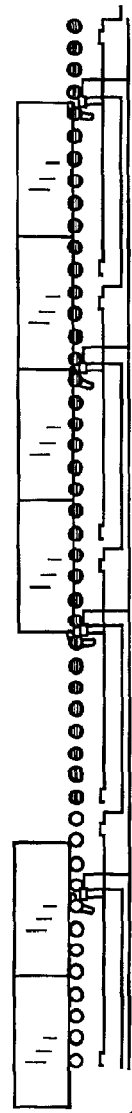
Figure 11D:
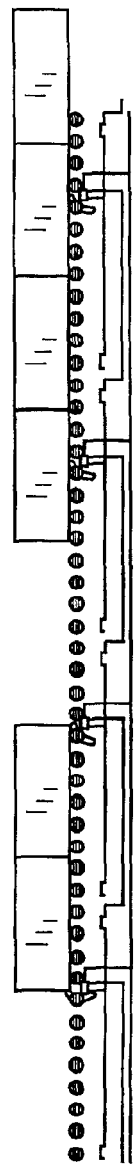
Figure 11E:
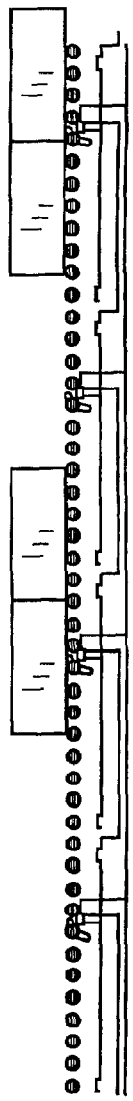

Referring to FIG. 10, in a second embodiment the actuator 20 of the present invention can be replaced with a dummy actuator 200. The dummy actuator 200 is the same as actuator 20 except that the air inlet 100 is removed and replaced with an air inlet 202. The air inlet 202 is located such that the second piston 70 does not block the air inlet 202 when in the third mode, as in FIG. 5. Because of this modification, when the bladders 14 of a zone are first inflated, the actuator 20 does not wait until the sensor roller 6 rises after the carton 18 has left the zone to shift to the second mode, as in FIG. 4. Explained another way, when taking away previously accumulated cartons 18, the actuator 20 does not go from the third mode to the first mode after the carton 18 has been transported away and then immediately to the second mode where the sensor roller 6 is held down. Instead, the dummy actuator 200 goes immediately from the third mode where the sensor roller 6 is held down by the carton 18 to the second mode where the sensor roller 6 is held down by the dummy actuator 200, even before the carton 18 has cleared the sensor roller 6. As a result, the dummy actuator 200 immediately inflates the bladders 14 of the next upstream zone.

V. Operation of Conveyor With Combination of Dummy and Smart Actuators

Referring to FIGS. 11A–E, there is shown a first zone 210, a second zone 212, a third zone 214 and a fourth zone 216. In the first, third and fourth zones 210, 214, 216 there is provided smart actuators 20 and in the second zone 212 there is provided the dummy actuator 200. When the conveyor 1 goes into transportation mode, the bladders 14 of the first zone 210 are pressurized, as in FIG. 11A. In FIGS. 11A–11E, driven rollers are indicated as shaded rollers and undriven rollers are indicated as unshaded rollers. Because the first zone 210 utilizes a smart actuator 20, the second zone 212 is not pressurized until the cartons 18 of the first zone 210 clear the sensor roller 6. Once the cartons 18 of the first zone 210 clear the sensor roller 6, the second zone 212 is pressurized, as in FIG. 11B, and begins to transport the cartons 18 of the second zone 212. Because the second zone 212 utilizes a dummy actuator 200, the third zone 214 is immediately pressurized causing the rollers 2 of both the second zone 212 and the third zone 214 to nearly simultaneously begin transporting cartons 18 from those zones 212, 214. The third zone 214 utilizes a smart actuator 20, so the fourth zone 216 is not pressurized by the third zone 214 until the cartons 18 have cleared the sensor roller 6 of the third zone 214. Once the cartons 18 have cleared the sensor roller of the third zone 214, the fourth zone 216 is pressurized and the rollers 2 in the fourth zone 216 are driven to convey the cartons 18 within the fourth zone 216. It should be appreciated that by alternating zones with dummy actuators and smart actuators, the rate at which cartons are transported can be increased over the usage of all smart actuators 20. If the actuators 20, 200 are provided with both the dummy actuator air 202 inlet and the smart actuator air inlet 100, one inlet may be plugged and the other utilized in order to easily switch the actuator from smart operation to dummy operation without changing actuators. As a result, a line may be easily switched from smart operation to dummy operation to vary the transportation rate of the cartons without adding or removing hardware. Additionally, because smart actuators do not pressurize an upstream zone until the downstream zone is clear of cartons, cartons with different weights may be used on a single accumulating conveyor without having to adjust orifice sizes of the actuators in order to obtain the correct delay between activation of zones to obtain a desired singulation.

While the specific embodiments have been illustrated and described, numerous modifications come to mind without significantly departing from the spirit of the invention, and the scope of protection is only limited by the scope of the accompanying claims.

We claim:

1. An accumulating conveyor comprising:
    a first plurality of zones, the zones capable of being separately driven in order to accumulate or transport cartons, each zone comprising;
        a sensor for sensing the presence of a carton within the zone;
        an actuator that allows movement of the sensor between an up position wherein the sensor is capable of contacting the cartons and a down position wherein the sensor is not capable of contacting the cartons; and
    wherein the actuator of at least one of the zones comprises means for providing a signal to an adjacent, upstream zone to begin conveying cartons only when the sensor within the at least one zone senses the absence of a carton within that zone when the conveyor switches from an accumulation mode to a transportation mode.

2. The conveyor of claim 1 wherein the actuator of the at least one zone comprises a first and a second piston disposed within a cylinder housing wherein the first piston comprises a stem and a bore, the stem being capable of operating the sensor of the same zone and the bore being capable of receiving a stem of the second piston, the two pistons defining a central chamber, the second piston being capable of operating a valve associated with the piston.

3. The conveyor of claim 2 wherein the valve comprises a valve stem movable between an on position and an off position, wherein in the on position a signal is transmitted to an upstream zone to start the upstream zone conveying cartons and in the off position the signal is removed.

4. The conveyor of claim 3 wherein the sensor of the at least one zone is held in the down position except when the conveyor is accumulating and an adjacent downstream sensor senses the presence of a carton in an adjacent downstream zone.

5. The conveyor of claim 4 wherein the actuator of the at least one zone has three modes comprising:
    a first mode wherein the sensor of the at least one zone is forced into the up position by a spring and wherein the first and second pistons are forced to the bottom of their travel within the cylinder housing and the valve stem is pushed to the on position by the second piston;
    a second mode wherein the first piston is forced to the top of its travel and holds the sensor of the at least one zone in the down position and the second piston is forced to the bottom of its travel and holds the valve stem in the on position; and
    a third mode wherein the sensor of the at least one zone is held in the down position by a carton and the valve stem is biased to the off position and forces the first and second pistons to the top of their travel.

6. The conveyor of claim 5 wherein when the at least one actuator is in the third mode an air inlet within the cylinder housing is blocked by the second piston.

7. The conveyor of claim 1 further comprising:
    a second plurality of zones;
    a sensor disposed within the second plurality of zones;
    a dummy actuator disposed within the second plurality of zones that allows movement of the sensor between an up position wherein the sensor is capable of contacting the cartons and a down position wherein the sensor is not capable of contacting the cartons;
    wherein the dummy actuators comprise means for providing a signal to an adjacent, upstream zone to begin conveying cartons immediately upon receiving a signal from an adjacent, downstream zone to begin conveying cartons when the conveyor switches from an accumulation mode to a transportation mode.

8. The conveyor of claim 7 wherein zones of the first plurality of zones and zones of the second plurality of zones are alternated.

9. The conveyor of claim 7 wherein zones of the first plurality of zones are provided every third zone and zones of the second plurality of zones comprise the remaining zones of the conveyor.

10. A method of controlling a conveyor comprising the steps of:
    dividing the conveyor into a plurality of zones, wherein each zone is capable of being separately driven in order to accumulate or transport cartons;

providing a sensor for each zone, each sensor capable of sensing the presence of cartons within the zone;

holding the sensor in a down position where the sensor is not capable of contacting a carton at least 1) when the conveyor is not accumulating cartons and 2) when the conveyor is accumulating cartons and an adjacent, downstream sensor does not sense the presence of a carton within the downstream, adjacent zone;

holding the sensor in an up position where the sensor is capable of contacting a carton when the conveyor is accumulating cartons and an adjacent, downstream sensor senses the presence of a carton within the downstream, adjacent zone; and switching a zone from an accumulation mode to a transportation mode only when an adjacent, downstream zone does not sense the presence of a carton within the adjacent, downstream zone.

11. A method of controlling a conveyor comprising the steps of:

dividing the conveyor into a plurality of zones, wherein each zone is capable of being separately driven in order to accumulate or transport cartons;

providing a sensor for each zone, each sensor capable of sensing the presence of cartons within the zone;

holding the sensor in a down position where the sensor is not capable of contacting a carton at least 1) when the conveyor is not accumulating cartons and 2) when the conveyor is accumulating cartons and an adjacent, downstream sensor does not sense the presence of a carton within the downstream, adjacent zone;

holding the sensor in an up position where the sensor is capable of contacting a carton when the conveyor is accumulating cartons and an adjacent, downstream sensor senses the presence of a carton within the downstream adjacent zone;

dividing the conveyor into a second plurality of zones, wherein each zone is capable of being separately driven in order to accumulate or transport cartons;

providing a dummy actuator disposed within each zone of the second plurality of zones;

holding each dummy actuator in a down position where each dummy actuator is not capable of contacting a carton 1) when the conveyor is not accumulating cartons and 2) while accumulating cartons when an adjacent, downstream does not sense the presence of a carton within the downstream, adjacent zone;

holding each dummy actuator in an up position where each dummy actuator is capable of contacting a carton only when the conveyor is accumulating cartons and an adjacent, downstream actuator senses the presence of a carton within the downstream, adjacent zone; and in each of the second plurality of zones, sending a signal to an adjacent, upstream zone to begin conveying cartons immediately upon receiving a signal from an adjacent, downstream zone to begin conveying cartons.

12. The method of claim 11 wherein zones of the first plurality of zones and zones of the second plurality of zones are alternated.

13. The method of claim 11 wherein zones of the first plurality of zones are provided every third zone and zones of the second plurality of zones comprise the remaining zones of the conveyor.

* * * * *

UNITED STATES PATENT AND TRADEMARK OFFICE
CERTIFICATE OF CORRECTION

PATENT NO. : 6,848,567 B2
DATED : February 1, 2005
INVENTOR(S) : John J. Kilper and Michael J. Leary It is certified that error appears in the above-identified patent and that said Letters Patent is hereby corrected as shown below:

Column 1,
Line 62, replace "et a." with -- et al. --

Column 7,
Line 56, after the word "comprising", replace ";" with -- : --

Column 10,
Line 3, after the word "downstream", insert -- , --
Line 11, after the word "carton", insert -- : --

Signed and Sealed this

Third Day of May, 2005

JON W. DUDAS
*Director of the United States Patent and Trademark Office*